(12) United States Patent
Mikazuki et al.

(10) Patent No.: US 10,767,686 B2
(45) Date of Patent: Sep. 8, 2020

(54) VEHICULAR PROPELLER SHAFT

(71) Applicant: Toyota Jidosha Kabushiki Kaisha, Toyota-shi (JP)

(72) Inventors: Atsuo Mikazuki, Toyota (JP); Tatsuya Isono, Toyota (JP); Kohki Kawarada, Toyota (JP); Atsushi Mori, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 307 days.

(21) Appl. No.: 15/895,306

(22) Filed: Feb. 13, 2018

(65) Prior Publication Data
US 2018/0231050 A1 Aug. 16, 2018

(30) Foreign Application Priority Data
Feb. 16, 2017 (JP) ................. 2017-027377

(51) Int. Cl.
*F16C 3/02* (2006.01)
*F16F 7/12* (2006.01)
(Continued)

(52) U.S. Cl.
CPC .............. *F16C 3/023* (2013.01); *B60K 17/22* (2013.01); *F16D 3/06* (2013.01); *F16F 7/12* (2013.01);
(Continued)

(58) Field of Classification Search
CPC .. F16C 3/023; F16C 2240/70; F16C 2240/60; F16C 2226/36; F16C 3/03; F16F 7/12;
(Continued)

(56) References Cited

U.S. PATENT DOCUMENTS 5,320,579 A * 6/1994 Hoffmann ............... F16C 3/026
464/183
5,566,777 A 10/1996 Trommer et al.
5,601,494 A 2/1997 Duggan

FOREIGN PATENT DOCUMENTS

DE 29 14 657 A1 * 10/1980 ................... 464/183
JP 6-278554 10/1994
(Continued)

OTHER PUBLICATIONS

Universal Joint and Driveshaft Design Manual, AE-7, Society of Automotive Engineers, Inc., Warrendale, PA, p. 71, TJ1079.S62. (Year: 1979).*

*Primary Examiner* — Greg Binda
(74) *Attorney, Agent, or Firm* — Oblon, McClelland, Maier & Neustadt, L.L.P.

(57) ABSTRACT

A vehicular propeller shaft through which a rotary motion of a drive power source is transmitted to drive wheels and which includes a first tubular member and a second tubular member. The first tubular member has a large-diameter cylindrical section, a small-diameter cylindrical section having a smaller outside diameter than the large-diameter cylindrical section, and a tapered cylindrical section formed between one end of the large-diameter cylindrical section and the small-diameter cylindrical section. The large-diameter cylindrical section, the small-diameter cylindrical section and the tapered cylindrical section are formed integrally with each other. The second tubular member is coaxially joined to the first tubular member and formed of a material having a higher degree of strength than the first tubular member.

18 Claims, 4 Drawing Sheets

(51) Int. Cl.
    *B60K 17/22* (2006.01)
    *F16D 3/06* (2006.01)
    *F16C 3/03* (2006.01)
    *F16D 1/027* (2006.01)
    *F16D 3/38* (2006.01)

(52) U.S. Cl.
    CPC ............. *B60Y 2306/01* (2013.01); *F16C 3/03* (2013.01); *F16C 2226/36* (2013.01); *F16C 2240/60* (2013.01); *F16C 2240/70* (2013.01); *F16D 1/027* (2013.01); *F16D 3/387* (2013.01)

(58) Field of Classification Search
    CPC . B60K 17/22; F16D 3/06; F16D 1/027; F16D 3/387; B60Y 2306/01
    USPC .......................................... 464/183; 280/777
    See application file for complete search history.

(56) References Cited

FOREIGN PATENT DOCUMENTS

| | | |
|---|---|---|
| JP | 7-332346 A | 12/1995 |
| JP | 2002-213429 A | 7/2002 |
| JP | 2004-322816 A | 11/2004 |
| JP | 2006-175938 | 7/2006 |
| JP | 2007-203751 | 8/2007 |

\* cited by examiner

FIG.5 ly joined to the first tubular member and formed of a material having a
VEHICULAR PROPELLER SHAFT This application claims priority from Japanese Patent Application No. 2017-027377 filed on Feb. 16, 2017, the disclosure of which is herein incorporated by reference in its entirety.

FIELD OF THE INVENTION

The present invention relates to a propeller shaft of a vehicle, which is disposed so as to extend in a longitudinal direction of the vehicle to transmit a drive force from a drive power source to rear drive wheels, and particularly to a technique for absorbing an impact energy in the event of collision of the vehicle, by the vehicular propeller shaft.

BACKGROUND OF THE INVENTION

There is known a technique for reducing an impact energy in the event of collision of a vehicle, with buckling of an intermediate portion of a propeller shaft of the vehicle, namely deformation of the intermediate portion in a direction of the collision. The intermediate portion has sections having respective different diameters. JP-2006-175938A discloses an example of this type of vehicular propeller shaft. This vehicular propeller shaft is configured such that a portion of the propeller shaft undergoes buckling deformation in a running direction of the vehicle, that is, in the axial direction of the propeller shaft, upon application of the impact energy to the vehicle in the rearward direction. The propeller shaft thus configured to absorb the impact energy generated in the event of collision of the vehicle permits reduction of an impact force to be applied to the vehicle upon its collision.

The vehicular propeller shaft is required to be reduced in weight, for improvement of fuel economy of the vehicle. For reducing the weight of the vehicle, it is effective to form the propeller shaft by using a material having a high degree of strength, for thereby reducing a required wall thickness of the propeller shaft. To this end, it is effective to increase the strength, that is, a tensile strength of a steel pipe or tube which is generally used for the vehicular propeller shaft. Where the material having a high degree of tensile strength, for example, a high tensile-strength steel tube is used for the propeller shaft, however, this material has a low degree of workability, and difficulty to form the propeller shaft having a complicated geometrical configuration for effective absorption of the impact energy in the event of collision of the vehicle.

SUMMARY OF THE INVENTION

The present invention was made in view of the background art described above. It is therefore an object of the present invention to provide a vehicular propeller shaft which is formed of a material having a high degree of strength, that is, a high degree of tensile strength, to reduce its required wall thickness for thereby improving fuel economy of a vehicle, and which permits effective absorption of an impact energy generated in the event of collision of the vehicle, with its deformation in its axial direction.

The object indicated above is achieved according to the following modes of the present invention:

According to a first mode of the invention, there is provided a vehicular propeller shaft through which a rotary motion of a drive power source is transmitted to drive wheels, the vehicular propeller shaft comprising: a first tubular member having a large-diameter cylindrical section, a small-diameter cylindrical section having a smaller outside diameter than the large-diameter cylindrical section, and a tapered cylindrical section formed between one end of the large-diameter cylindrical section and the small-diameter cylindrical section, and wherein the large-diameter cylindrical section, the small-diameter cylindrical section and the tapered cylindrical section are formed integrally with each other; and a second tubular member coaxially joined to the first tubular member and formed of a material having a higher degree of strength than the first tubular member.

According to a second mode of the invention, the propeller shaft according to the first mode of the invention is configured such that the second tubular member has a smaller wall thickness than the first tubular member.

According to a third mode of the invention, the propeller shaft according to the first or second mode of the invention is configured such that the second tubular member has a larger dimension in its axial direction than the first tubular member.

According to a fourth mode of the invention, the propeller shaft according to any one of the first through third modes of the invention is configured such that a difference between values of strength of materials of the first and second tubular members is at least 100 MPa.

According to a fifth mode of the invention, the propeller shaft according to any one of the first through fourth modes of the invention is configured such that the second tubular member has the same outside diameter as the small-diameter cylindrical section of the first tubular member and is joined to the small-diameter cylindrical section.

According to a sixth mode of the invention, the propeller shaft according to any one of the first through fifth modes of the invention is configured such that the first tubular member further has another small-diameter cylindrical section having a smaller outside diameter than the above-described large-diameter cylindrical section and small-diameter cylindrical section, and another tapered cylindrical section formed between the other end of the large-diameter cylindrical section and the above-described another small-diameter cylindrical section.

According to a seventh mode of the invention, the propeller shaft according to the sixth mode of the invention is configured such that the above-described another small-diameter cylindrical section is connected to a first universal joint through a shaft an axial length of which is variable, and the second tubular member is connected, at its axial end remote from the first tubular member, to a second universal joint.

The vehicular propeller shaft according to the first mode of the invention is provided to transmit the rotary motion of the drive power source to the drive wheels. The vehicular propeller shaft includes the first tubular member and the second tubular member. The first tubular member has the large-diameter cylindrical section, the small-diameter cylindrical section having the smaller outside diameter than the large-diameter cylindrical section, and the tapered cylindrical section formed between one axial end of the large-diameter cylindrical section and the small-diameter cylindrical section. The large-diameter cylindrical section, the small-diameter cylindrical section and the tapered cylindrical section are formed integrally with each other. The second tubular member is coaxially joined to the first tubular member and formed of the material having a higher degree of strength than the first tubular member. By using the first tubular member which can be comparatively easily formed so as to include the large-diameter cylindrical section, the small-diameter cylindrical section and the tapered cylindrical section, which cooperate to have a complicated geometrical configuration, these sections undergo deformation in the axial direction in the event of collision of a vehicle, and effectively absorb an impact energy. Namely, the large-diameter cylindrical section, small-diameter cylindrical section and tapered cylindrical section of the first tubular member are compressed and deformed by the second tubular member having the higher degree of strength, in the event of collision of the vehicle, so that the impact energy generated upon collision of the vehicle can be effectively absorbed.

According to the second mode of the invention, the second tubular member has a smaller wall thickness than the first tubular member, so that the propeller shaft can be reduced in weight, whereby fuel economy of the vehicle can be improved.

According to the third mode of the invention, the second tubular member has a larger dimension in its axial direction than the first tubular member, so that the propeller shaft can be effectively reduced in thickness and weight, whereby the fuel economy of the vehicle can be further improved.

According to the fourth mode of the invention wherein the difference between the strength values of the materials of the first and second tubular members is at least 100 MPa, the first tubular member can be suitably formed so as to effectively absorb the impact energy generated upon collision of the vehicle, while the second tubular member having the comparatively small wall thickness can improve the fuel economy of the vehicle.

According to the fifth mode of the invention wherein the second tubular member has the same outside diameter as the small-diameter cylindrical section of the first tubular member and is joined to the small-diameter cylindrical section. Accordingly, the second tubular member is joined over its entire wall in cross section to the small-diameter cylindrical section of the first tubular member, so that an impact load is uniformly applied to the second tubular member over its entire wall upon transmission of the impact energy from the first tubular member to the second tubular member in the event of collision of the vehicle, whereby the second tubular member can stably receive the impact load over its entire wall at its axial end joined to the first tubular member. Further, the strength of the second tubular member having the same outside diameter as the small-diameter cylindrical section of the first tubular member can be maximized. In addition, the thus increased strength of the second tubular member permits its accordingly reduced wall thickness, and a consequent improvement of the fuel economy of the vehicle.

According to the sixth mode of the invention, the first tubular member has the another small-diameter cylindrical section having the smaller outside diameter than the large-diameter cylindrical portion and the above-described small-diameter cylindrical section, and the another tapered cylindrical section formed between the other end of the large-diameter cylindrical section and the above-described another small-diameter cylindrical section, so that the first tubular member may be initially deformed at an appropriate one of its various sections including the tapered cylindrical sections. Further, the first tubular member can be deformed in a larger number of various fashions, so that the first tubular member can absorb a larger amount of impact energy upon collision of the vehicle.

According to the seventh mode of the invention, the above-described another small-diameter cylindrical section is connected to the first universal joint through the shaft the axial length of which is variable, and the second tubular member is connected, at its axial end remote from the first tubular member, to the second universal joint. Accordingly, vibrations of the propeller shaft in its axial direction due to vertical movements of the drive wheels can be easily absorbed, so that the rotary motion of the drive power source can be stably transmitted to the drive wheels through the propeller shaft, irrespective of the vertical movement of the drive wheels.

DETAILED DESCRIPTION OF PREFERRED EMBODIMENTS

Preferred embodiments of this invention will be described in detail by reference to the drawings. It is to be understood that the drawings are simplified and transformed as needed, and do not necessarily accurately represent dimensions and shapes of various elements of the embodiments.

First Embodiment

Figure 1:
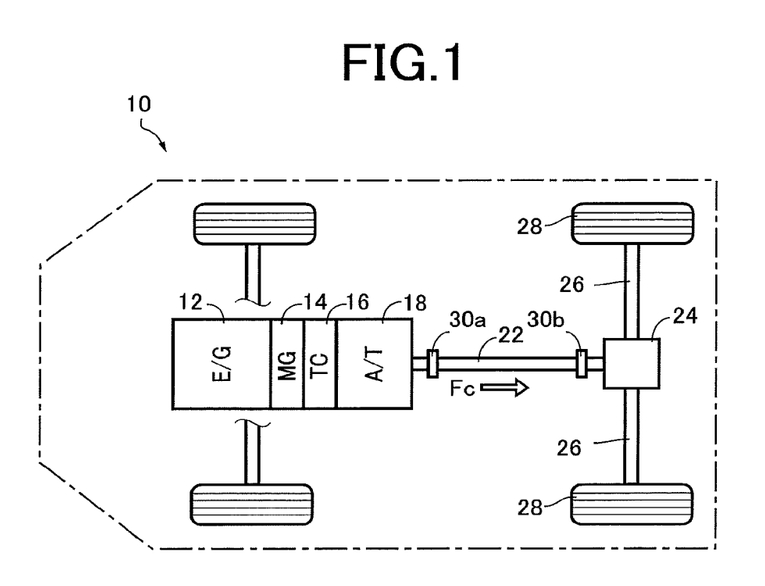
FIG. 1 is a schematic view showing an arrangement of a vehicle to which the present invention is applicable, and schematically indicating a position of a propeller shaft of the vehicle.

FIG. 1 is the schematic view showing a drive system of a hybrid vehicle 10 to which the present invention is applicable. As shown in FIG. 1, the vehicle 10 is of an FR type (front-engine rear-drive type), and is provided with an engine 12 as a vehicle drive power source in the form of an internal combustion engine such as a gasoline engine or a diesel engine, and a motor/generator 14 functioning as an electric motor and an electric generator. Outputs or rotary motions of the engine 12 and motor/generator are transmitted to an automatic transmission 18 through a fluid-operated power transmitting device in the form of a torque converter 16, then to a differential gear device 24 through a propeller shaft 22, and finally to left and right rear drive wheels 28 through respective axles 26.

Figure 2:
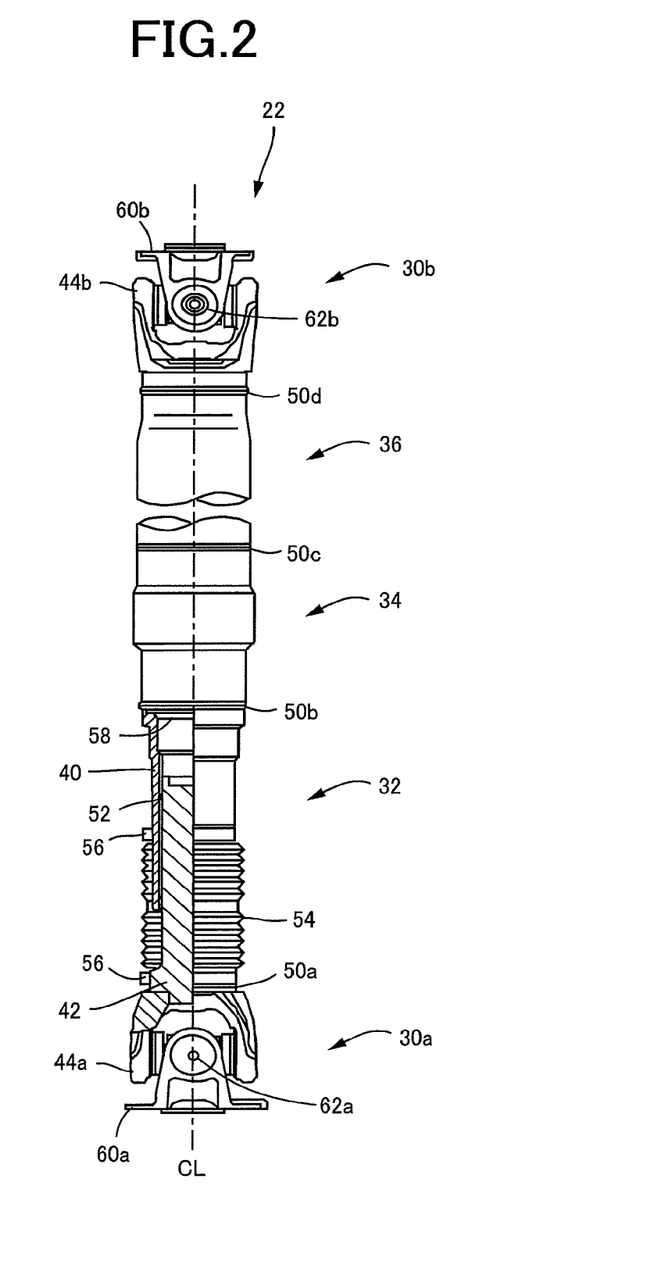
FIG. 2 is a view showing an example of the propeller shaft provided in the vehicle of FIG. 1.

FIG. 2 is the view showing the vehicular propeller shaft 22 according to the present invention. The propeller shaft 22 is constituted by a front portion 32, an intermediate portion 34 and a rear portion 36. The front portion 32 is connected to an output shaft (not shown) of the automatic transmission 18 through a first universal joint 30*a*, while the rear portion 36 is connected to an input shaft (not shown) of the differential gear device 24 through a second universal joint 30*b*.

The first universal joint 30*a* is constituted by: a yoke 44*a* which is a part of the front portion 32; a yoke 60*a* joined to the output shaft of the automatic transmission 18; and a crisscross shaft 62*a* which universally connects the yokes 44*a* and 60*a* to each other. The second universal joint 30*b* is constituted by: a yoke 44*b* which is a part of the rear portion 36; a yoke 60b joined to the input shaft of the differential gear device 24; and a crisscross shaft 62b which universally connects the yokes 44b and 60b to each other. The first and second universal joints 30a and 30b permit a rotary motion received by the propeller shaft 22 from the automatic transmission 18, to be transmitted to the differential gear device 24, even where the rear drive wheels 28 are moved up and down according to a surface condition of a roadway, that is, even where the propeller shaft 22 is inclined. Further, a rotating speed of the first universal joint 30a varies due to a variation of an angle between an input shaft (not shown) of the first universal joint 30a and the propeller shaft 22 as a result of the vertical movement of the rear drive wheels 28, the variation of the rotating speed of the first universal joint 30a can be offset by a variation of an angle between an output shaft (not shown) of the second universal joint 30h and the propeller shaft 22, which variation takes place in a direction opposite to a direction of the variation of the angle between the input shaft of the first universal joint 30a and the propeller shaft 22.

The front portion 32 of the propeller shaft 22 is constituted by a splined sleeve portion 40 having spline teeth (not shown) formed in its inner circumferential surface, and a splined shaft portion 42 having spline teeth (not shown) formed in its outer circumferential surface. The splined sleeve portion 40 and the splined shaft portion 42 are spline-connected to each other at a spline-coupling portion 52 such that the splined sleeve and shaft portions 40 and 42 are movable relative to each other in a direction of an axis CL of rotation of the propeller shaft 22, and are rotated together with each other about the axis CL. The splined sleeve and shaft portions 40 and 42 are covered over a part of their axial lengths by a bellows-type sealing member 54 which is expandable and contractible in the direction of the axis CL. The sealing member 54 is fixed at its opposite axial ends by retainer members 56, and functions to prevent entry of any external foreign matters into the spline-coupling portion 52 between the splined sleeve and shaft portions 40 and 42. Further, a fitting plate 58 is fixed by welding to an axial end of the splined sleeve portion 40 on the side of the intermediate portion 34, and functions as a stop to prevent an axial movement of the splined shaft portion 42 toward the intermediate portion 34. It is noted that the other axial end of the splined sleeve portion 40 may be held in abutting contact with the corresponding axial end of the splined shaft portion 42, as another stop to prevent the axial movement of the splined shaft portion 42.

The splined sleeve portion 40 is formed by performing mechanical operations on a hollow cylindrical blank of a carbon steel such as S43C or S45C, to form shoulders and spline teeth, and then hardening selected portions of the hollow cylindrical blank. Similarly, the splined shaft portion 42 is formed by performing mechanical operations on a solid cylindrical blank of a carbon steel such as S43C or S45C, to form shoulders and spline teeth, and then hardening selected portions of the solid cylindrical blank. The splined shaft portion 42 is integrally welded to the yoke 44a of the first universal joint 30a. The splined sleeve portion 40 is integrally welded to the intermediate portion 34. It is noted that for welding the splined shaft portion 42 to the yoke 44a and welding the splined sleeve portion 40 to the intermediate portion 34, a suitable welding method such as friction welding or arc welding is selected depending upon the materials to be welded together, and the required accuracy of welding.

The rear portion 36 is a hollow cylinder having a relatively long length in the direction of the axis CL, and the yoke 44b of the second universal joint 30b is integrally welded to the hollow cylinder. This rear portion 36 the length of which in the direction of the axis CL is a considerably large part of the entire length of the propeller shaft 22 is formed of a material having a high degree of strength per weight, for reducing its weight and improving fuel economy of the vehicle 10, and since the rear portion 36 receives a relatively large torque. Further, the rear portion 36 is generally required to have a comparatively simple structure such as a cylinder not having large shoulders, for preventing reduction of its strength, and for improving the fuel economy of the vehicle 10 and assuring required strength of the rear portion 36.

The intermediate portion 34 is located between the front portion 32 and the rear portion 36, and is integrally welded to the front portion 32 and the rear portion 36. The intermediate portion 34 has different diameters, namely, shoulders formed over some lengths in the direction of the axis CL. The intermediate portion 34 is constituted by a first tubular member m1 formed of a metallic material having a lower degree of strength than a second tubular member m2 which constitutes the rear portion 36. For a hollow cylindrical blank for the intermediate portion 34, a carbon steel tube formed of STKM or STAM (defined in JIS (Japanese Industrial Standards)) for mechanical structures, or a hollow cylinder formed of a carbon steel material such as S43C, S45C (defined in JIS) or the like is used, for example. Hereinafter, a tensile strength (MPa) Ts used for evaluation of the strength of materials according to one of tensile strength tests (defined in JIS) is used to evaluate the materials of the propeller shaft 22, unless otherwise specified.

Figure 3:
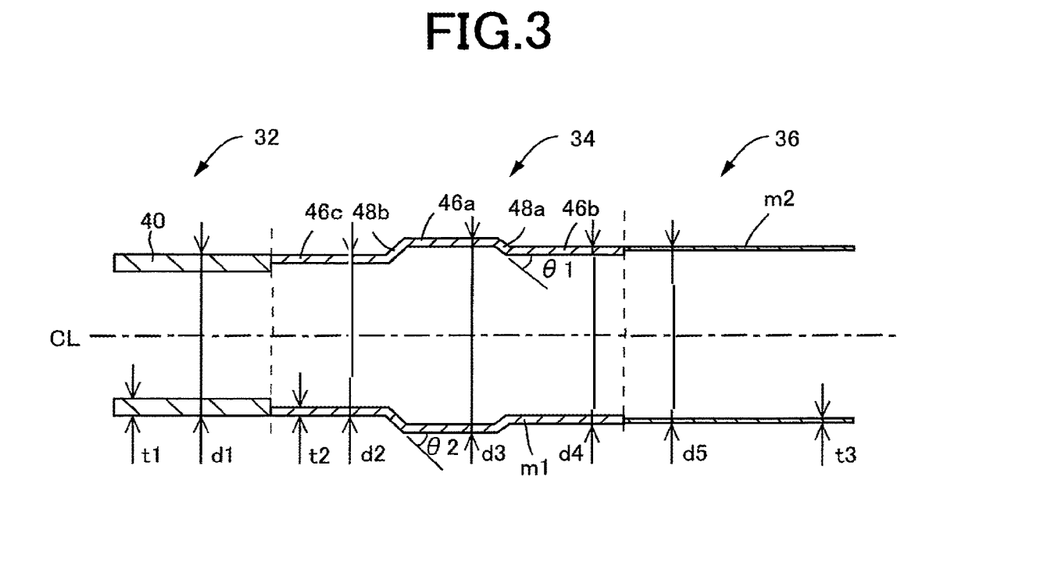
FIG. 3 is a cross sectional view illustrating an intermediate portion of the propeller shaft of FIG. 2 according to a first embodiment of the invention.

FIG. 3 is the cross sectional view illustrating the intermediate portion 34 of the propeller shaft 22 according to a first embodiment of this invention. The intermediate portion 34 is an integral body consisting of: a large-diameter cylindrical section 46a having an outside diameter d3; a first small-diameter cylindrical section 46b having an outside diameter d4 smaller than the outside diameter d3; a second small-diameter cylindrical section 46c having an outside diameter d2 smaller than the outside diameter d4; a first tapered cylindrical section 48a formed between the large-diameter cylindrical section 46a and the first small-diameter cylindrical section 46b; and a second tapered cylindrical section 48b formed between the large-diameter cylindrical section 46a and the second small-diameter cylindrical section 46c. A first taper angle θ1 of the first tapered cylindrical section 48a with respect to the first small-diameter cylindrical section 46b is smaller than a second taper angle θ2 of the second tapered cylindrical section 48b with respect to the large-diameter cylindrical section 46a. The intermediate portion 34 consisting of the large-diameter cylindrical section 46a, first small-diameter cylindrical section 46b, second small-diameter cylindrical section 46c, first tapered cylindrical section 48a and second tapered cylindrical section 48b functions as the first tubular member m1 having shoulder portions, and is formed by performing a plastic forming operation such as a roll forming operation on a hollow cylindrical blank, such that the intermediate portion 34 has a substantially constant wall thickness t2.

To the first small-diameter cylindrical section 46b, there is welded by friction welding, for example, the cylindrical rear portion 36 which has an outside diameter d5 substantially equal to the outside diameter d4 of the first small-diameter cylindrical section 46b. To the second small-diameter cylindrical section 46c, there is welded the splined sleeve portion 40 of the cylindrical front portion 32 having an outside diameter d1 substantially equal to the outside diameter d2 of the second small-diameter cylindrical section 46c. The splined sleeve portion 40 has the spline teeth in its inner circumferential surface, and a wall thickness t1 larger than the wall thickness t2 of the intermediate portion 34.

The propeller shaft 22 not only functions to transmit the output of the drive power source 12, 14 to the drive wheels 28, but also functions to effectively absorb an impact energy generated in the event of collision of the vehicle 10, owing to its compressive deformation (buckling) of the propeller shaft 22 in the direction of the axis CL, which takes place with a compressive force, namely, a compressive load Fc (kN) of about 100 kN, for instance, acting in the direction of the axis CL, as shown in FIG. 1, so that the propeller shaft 22 reduces a damage to an operator or other passengers of the vehicle 10 upon its collision. In the event of collision of the vehicle 10 in its running direction, the splined shaft portion 42 of the front portion 32 comes into abutting contact with the fitting plate 58, with a result of application of a compressive force to the intermediate portion 34 and subsequent deformation of the intermediate portion 34 in its axial direction, and absorption of an impact energy generated in the event of collision of the vehicle 10, so that an impact force to be applied to the vehicle 10 is reduced.

The compressive force at which the deformation of the intermediate portion 34 is initiated in the event of collision of the vehicle 10 is primarily determined by the strength and wall thickness t2 of the intermediate portion 34 in the form of the first tubular member m1, an outside diameter of the second small-diameter cylindrical section 46c, and the second taper angle θ2. When the compressive load Fc is applied to the intermediate portion 34 in the event of collision of the vehicle 10 where the second taper angle θ2 of the second tapered cylindrical section 48b with respect to the large-diameter cylindrical section 46a is set to be within a range between 50° and 90°, for example, the intermediate portion 34 is initially deformed at the opposite axial ends of the second tapered cylindrical section 48b, so that the large-diameter cylindrical section 46a and the second small-diameter cylindrical section 46c are moved toward each other, and then the intermediate portion 34 is deformed at the opposite axial ends of the first tapered cylindrical section 48a, so that the large-diameter cylindrical section 46a and the first small-diameter cylindrical section 46a are moved toward each other. Accordingly, the first tubular member m1 used as the intermediate portion 34 is formed of a material which permits the intermediate portion 34 to be shaped with a high degree of accuracy, in order to reduce an amount of variation of the compressive load Fc at which the deformation of the intermediate portion 34 is initiated in the event of collision of the vehicle 10.

In order for the deformation of the intermediate portion 34 to take place upon collision of the vehicle 10 prior to the deformation of the front portion 32 and the rear portion 36, the strengths of the front and rear portions 32 and 36 in the direction of the axis CL are required to be larger than that of the intermediate portion 34. The rear portion 36 which has a comparatively large dimension in the direction of the axis CL of the propeller shaft 22 is required to have a reduced weight for improving the fuel economy of the vehicle 10. Where the second tubular member m2 used as the rear portion 36 is formed from a carbon steel tube (high tensile-strength steel tube) used for mechanical structures, which has a tensile strength of at least 590 MPa, for example, the rear portion 36 can be given a sufficiently high tensile strength even though the rear portion 36 has a thickness t3 smaller than the thickness t2 of the intermediate portion 34. In this case, the rear portion 36 can satisfy the requirement for reduction of its weight and the requirement for its sufficient tensile strength. On the other hand, workability of the high tensile-strength steel tube and dimensional accuracy of the rear portion 36 formed from the high tensile-strength steel tube decrease with an increase of strength of the material of the high tensile-strength steel tube, so that it is difficult to accurately form the rear portion 36 such that the rear portion 36 can be deformed at a predetermined value of the compressive force Fc. In view of the above, the intermediate portion 34 which is designed to be deformed at the predetermined value of compressive force Fc is constituted by the first tubular member m1 in the form of the carbon steel tube used for mechanical structures, which has a high degree of workability and the strength of which is lower than that of the second tubular member m2, for example, about 490 MPa. Accordingly, the intermediate portion 34 can be easily obtained with a high degree of dimensional accuracy.

The vehicular propeller shaft 22 according to the first embodiment of the invention, which is provided to transmit the rotary motion of the drive power source in the form of the engine 12 and the motor/generator 14 to the rear drive wheels 28, is configured such that the vehicular propeller shaft 22 includes the first tubular member m1 and the second tubular member m2. The first tubular member m1 has the large-diameter cylindrical section 46a, the first small-diameter cylindrical section 46b having the smaller outside diameter d4 than the large-diameter cylindrical section 46a, and the first tapered cylindrical section 48a formed between one axial end of the large-diameter cylindrical section 46a and the first small-diameter cylindrical section 46b. The large-diameter cylindrical section 46a, the first small-diameter cylindrical section 46b and the first tapered cylindrical section 48a are formed integrally with each other. The second tubular member m2 is coaxially joined to the first tubular member m1 and formed of the material having a higher degree of strength than the first tubular member m1. In the event of collision of the vehicle 10, the first tapered cylindrical section 48a of the first tubular member m1 undergoes deformation and rupture, and effectively absorbs an impact energy generated upon collision of the vehicle 10, for reducing an impact force to be applied to the vehicle 10 upon its collision.

The vehicular propeller shaft 22 according to the first embodiment is further configured such that the second tubular member m2, namely, the rear portion 36 has the smaller wall thickness t3 than the first tubular member m1, namely, the intermediate portion 34, so that the propeller shaft 22 can be reduced in weight, whereby the fuel economy of the vehicle 10 can be improved.

The vehicular propeller shaft 22 according to the first embodiment is also configured such that the rear portion 36 provided by the second tubular member m2 has a larger dimension in the direction of the axis CL, than the first tubular member m1, so that the propeller shaft 22 can be effectively reduced in weight, whereby the fuel economy of the vehicle 10 can be further improved.

The vehicular propeller shaft 22 according to the first embodiment is further configured such that a difference between values of strength of the materials of the first and second tubular members m1 and m2 is at least 100 MPa, so that the first and second tubular members m1 and m2 satisfy their required different properties. Namely, the first tubular member m1 which can be accurately formed so as to have a complicated geometrical configuration is suitably used as the intermediate portion 34 which is required to have a more complicated geometrical configuration with a higher degree of accuracy than the rear portion 36. On the other hand, the second tubular member m2 is suitably used as the rear portion 36 which is required to have a smaller wall thickness than the intermediate portion 34, for improving the fuel economy of the vehicle 10. Thus, the intermediate portion 34 and the rear portion 36 satisfy their required properties.

The vehicular propeller shaft 22 according to the first embodiment is further configured such that the first tubular member m1 has the second small-diameter cylindrical section 46c and the second tapered cylindrical section 48b, so that the first tubular member may be initially deformed at an appropriate one of its various sections including the first and second tapered cylindrical sections. Further, the first tubular member m1 can be deformed in a larger number of various fashions, so that the first tubular member can absorb a larger amount of impact energy upon collision of the vehicle 10.

The vehicular propeller shaft 22 according to the first embodiment is also configured such that the second small-diameter cylindrical section 46c is connected to the front portion 32 which consists of the splined sleeve portion 40 and the splined shaft portion 42, and an axial length of which is variable, and such that the front portion 32 is connected, at its axial end remote from the second small-diameter cylindrical section 46c, to the first universal joint 30a, while the rear portion 36 is connected, at its axial end remote from the intermediate portion 34, to the second universal joint 30b. Accordingly, vibrations of the propeller shaft 22 in the direction of the axis CL due to vertical movements of the rear drive wheels 28 can be easily absorbed by the front portion 32, so that the rotary motion of the engine 12 and the motor/generator 14 can be stably transmitted to the rear drive wheels 28 through the propeller shaft 22, irrespective of the vertical movement of the rear drive wheels 28, namely, irrespective of inclination of the propeller shaft 22 in the vertical plane.

Another embodiment of this invention will be described. It is to be understood that the same reference signs as used in the first embodiment will be used in the following embodiment, to identify the same elements.

Second Embodiment

Figure 4:
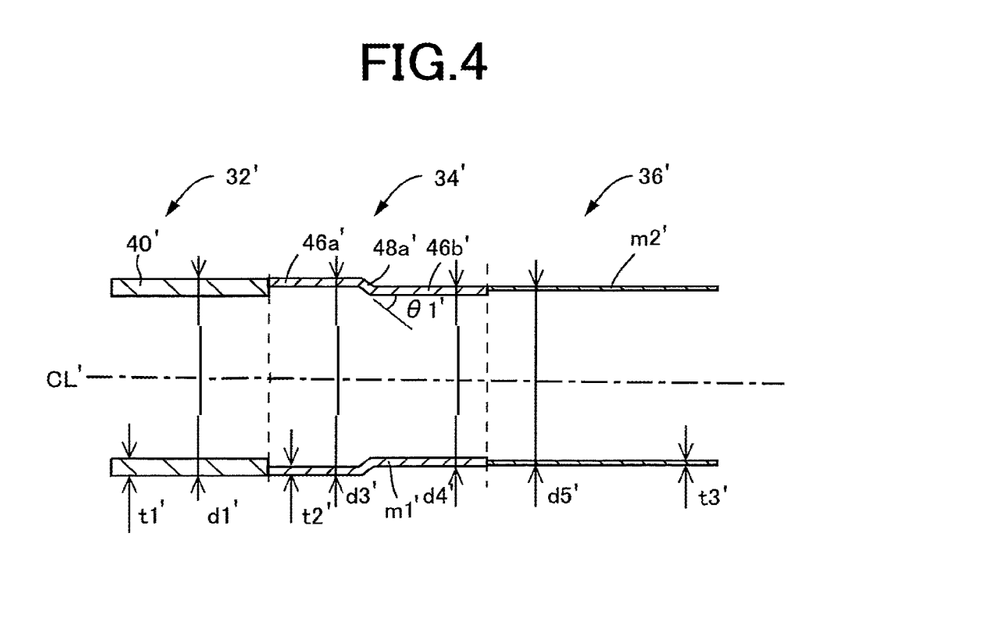
FIG. 4 is a cross sectional view illustrating the intermediate portion of the propeller shaft of FIG. 2 according to a second embodiment of the invention.

FIG. 4 is the cross sectional view illustrating the intermediate portion 34' of the propeller shaft 22 according to a second embodiment of the invention. The intermediate portion 34' consists of: the large-diameter cylindrical section 46a' having the outside diameter d3'; the first small-diameter cylindrical section 46b' having the outside diameter d4'; and the first tapered cylindrical section 48a' formed between the large-diameter cylindrical section 46a' and the first small-diameter cylindrical section 46b'. The first tapered cylindrical section 48a' has the first taper angle θ1' with respect to the first small-diameter cylindrical section 46b'. The first small-diameter cylindrical section 46b' of the intermediate portion 34' is integrally welded to the rear portion 36' having the outside diameter d5' equal to the outside diameter d4' of the first small-diameter cylindrical section 46b'. The rear portion 36' is constituted by the second tubular member m2 formed of the material having a higher degree of strength than the material of the first tubular member m1' which constitutes the intermediate portion 34'. The rear portion 36' has the wall thickness t3' smaller than the wall thickness t2' of the intermediate portion 34'. The large-diameter cylindrical section 46a' of the intermediate portion 34' is integrally welded to the splined sleeve portion 40' of the front portion 32' having the outside diameter d1' equal to that of the large-diameter cylindrical section 46a'. The splined sleeve portion 40' has the spline teeth (not shown) formed in its inner circumferential surface, and the wall thickness t1' larger than the wall thickness t2' of the intermediate portion 34'. The strength of the splined sleeve portion 40' in the direction of the axis CL' is higher than that of the intermediate portion 34'. It is noted that the dimensions of the various elements shown in FIG. 4 are selected so that the propeller shaft 22 is deformed in the direction of the axis CL' with the predefined compressive load Fc in the direction of the axis CL', in the event of collision of the vehicle 10, and that the dimensions are not necessarily the same as shown in FIG. 3.

The propeller shaft 22 according to the present second embodiment is provided to transmit the rotary motion of the drive power source in the form of the engine 12 and the motor/generator 14 to the rear drive wheels 28. The propeller shaft 22 includes the first tubular member m1' and the second tubular member m2'. The first tubular member m1' has the large-diameter cylindrical section 46a', the first small-diameter cylindrical section 46b' having the smaller outside diameter than the large-diameter cylindrical section 46a', and the first tapered cylindrical section 48a' formed between one axial end of the large-diameter cylindrical section 46a' and the first small-diameter cylindrical section 46b'. The large-diameter cylindrical section 46a', the first small-diameter cylindrical section 46b' and the first tapered cylindrical section 48a' are formed integrally with each other. The second tubular member m2' is coaxially joined to the first tubular member m1' and formed of the material having the higher degree of strength than the first tubular member m1'. In the event of collision of the vehicle 10, the first tapered cylindrical section 48a' of the first tubular member m1' undergoes deformation and rupture at its axial end portions, and effectively absorbs an impact energy generated upon collision of the vehicle 10, for reducing an impact force to be applied to the vehicle 10 upon its collision. Further, the rear portion 36' having the comparatively large dimension in the direction of the axis CL' is constituted by the second tubular member m2' having the comparatively high degree of strength, and can be formed with the comparatively small wall thickness, so that the propeller shaft 22 can be reduced in weight, whereby the fuel economy of the vehicle 10 can be improved.

A further embodiment of this invention will be described. It is to be understood that the same reference signs as used in the first embodiment will be used in the following embodiment, to identify the same elements.

Third Embodiment

Figure 5:
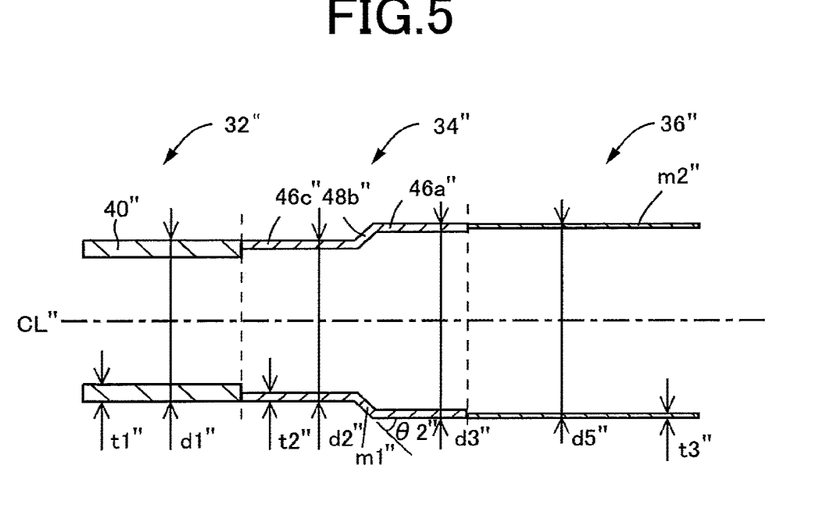
FIG. 5 is a cross sectional view illustrating the intermediate portion of the propeller shaft of FIG. 2 according to a third embodiment of the invention.

FIG. 5 is the cross sectional view illustrating the intermediate portion 34" of the propeller shaft 22 according to a third embodiment of the invention. The intermediate portion 34" consists of: the large-diameter cylindrical section 46a" having the outside diameter d3"; the second small-diameter cylindrical section 46c" having the outside diameter d2"; and the second tapered cylindrical section 48b" formed between the large-diameter cylindrical section 46a" and the second small-diameter cylindrical section 46c". The second tapered cylindrical section 48b" has the second taper angle θ2" with respect to the large-diameter cylindrical section 46a". The large-diameter cylindrical section 46a" of the intermediate portion 34" is integrally welded to the rear portion 36" having the outside diameter d5" equal to the outside diameter d3" of the large-diameter cylindrical section 46a". The rear portion 36" is constituted by the second tubular member m2" formed of the material having a higher degree of strength than the material of the first tubular member m1" which constitutes the intermediate portion 34". The rear portion 36" has the wall thickness t3" smaller than the wall thickness t2" of the intermediate portion 34". The second small-diameter cylindrical section 46c" of the intermediate portion 34" is integrally welded to the splined sleeve portion 40" of the front portion 32" having the outside diameter d1" equal to that of the second small-diameter cylindrical section 46c". The splined sleeve portion 40" has the spline teeth (not shown) formed in its inner circumferential surface, and the wall thickness t1" larger than the wall thickness t2" of the intermediate portion 34". The strength of the splined sleeve portion 40" in the direction of the axis CL" is higher than that of the intermediate portion 34". It is noted that the dimensions of the various elements shown in FIG. 5 are selected so that the propeller shaft 22 is deformed in the direction of the axis CL" with the predefined compressive load Fc in the direction of the axis CL", in the event of collision of the vehicle 10, and that the dimensions are not necessarily the same as shown in FIGS. 3 and 4.

The propeller shaft 22 according to the present third embodiment is provided to transmit the rotary motion of the drive power source in the form of the engine 12 and the motor/generator 14 to the rear drive wheels 28. The propeller shaft 22 includes the first tubular member m1" and the second tubular member m2". The first tubular member m1" has the large-diameter cylindrical section 46a", the second small-diameter cylindrical section 46c" having the smaller outside diameter than the large-diameter cylindrical section 46a", and the second tapered cylindrical section 48b" formed between one axial end of the large-diameter cylindrical section 46a" and the second small-diameter cylindrical section 46c". The large-diameter cylindrical section 46a", the second small-diameter cylindrical section 46c" and the second tapered cylindrical section 48b" are formed integrally with each other. The second tubular member m2" is coaxially joined to the first tubular member m1" and formed of the material having the higher degree of strength than the first tubular member m1". In the event of collision of the vehicle 10, the second tapered cylindrical section 48b" of the first tubular member m1 undergoes deformation and rupture at its axial end portions, and effectively absorbs an impact energy generated upon collision of the vehicle 10, for reducing an impact force to be applied to the vehicle 10 upon its collision. Further, the rear portion 36" having the comparatively large dimension in the direction of the axis CL" is constituted by the second tubular member m2" having the comparatively high degree of strength, and can be formed with the comparatively small wall thickness, so that the propeller shaft 22 can be reduced in weight, whereby the fuel economy of the vehicle 10 can be improved.

While the preferred embodiments of this invention have been described above by reference to the drawings, it is to be understood that invention may be otherwise embodied.

In the illustrated embodiments, the propeller shaft 22 is provided on the hybrid vehicle 10 having the engine 12 and the motor/generator 14 as the drive power source. However, the present invention is applicable to a propeller shaft provided on any FR type vehicle other than a hybrid vehicle, which has a single drive power source device such as a gasoline engine, a diesel engine or a motor/generator.

The hybrid vehicle 10 in the illustrated embodiments has the torque converter 16 and the automatic transmission 18, the vehicle including the propeller shaft according to the invention need not be provided with the torque converter 16. Further, the automatic transmission 18 may be a step-variable automatic transmission, or a belt-and-pulley type continuously variable transmission having a pair of variable-diameter pulleys and a transmission belt connecting the pair of variable-diameter pulleys, for example.

In the illustrated embodiments, the wall thickness t1 of the splined sleeve portion 40 of the front portion 32 of the propeller shaft 22 is larger than the wall thickness t2 of the intermediate portion 34. However, like the rear portion 36, the front portion 32 may be constituted by a tubular member similar to the second tubular member m2, which is formed of a material having a higher degree of strength than the first tubular member m1, so that the splined sleeve portion 40 has a wall thickness smaller than the intermediate portion 34. Alternatively, the front portion 32 may be formed of a material having a lower degree of tensile strength than the first tubular member m1, with its splined sleeve portion 40 having the wall thickness t1 larger than the wall thickness t2 of the intermediate portion 34, as long as the strength of the splined sleeve portion 40 in the direction of the axis CL is higher than the intermediate portion 34 so that the deformation of the intermediate portion 34 to take place upon collision of the vehicle 10 prior to the deformation of the front portion 32 and the rear portion 36.

In the illustrated embodiments, each of the front portion 32 and the rear portion 36 is welded to the intermediate portion 34, at least one of the large-diameter cylindrical section 46a, the first small-diameter cylindrical section 46b and the second small-diameter cylindrical section 46c, which have cylindrical shapes and concentric with the rotation axis CL. However, the front portion 32 and the rear portion 36 may be welded to the first or second tapered cylindrical section 48a, 48b having the first or second taper angle θ1 or θ2 with respect to the axis CL. The front portion 32 and the rear portion 36 need not be cylindrical portions having the same outside diameter, and may be modified in their shapes and dimensions as needed.

In the illustrated embodiments, the strength of the materials of the propeller shaft 22 is evaluated in terms of the tensile strength, the strength may be evaluated in terms of the fracture strength, compressive strength, etc.

In the illustrated embodiments, the first tubular member m1 and the second tubular member m2 are carbon steel tubes of STKM or STAM (defined in JIS) used for mechanical structures, or formed of carbon steels of S43C or S45C (defined in JIS). However, the materials of the tubular members m1 and m2 are not limited to those carbon steel materials, and may be various other materials such as carbon steel alloys containing other metallic materials. Further, at least one of the first and second tubular members m1 and m2 may be formed of a resin material such as a fiber-reinforced plastic material, or a ceramic material such as partially stabilized zirconia.

While the preferred embodiments of the invention and the modifications have been described for illustrative purpose only, it is to be understood that the present invention may be embodied with various other changes and improvements which may occur to those skilled in the art.

NOMENCLATURE OF ELEMENTS

10: Vehicle
12: Engine (Drive power source)
14: Motor/generator (Drive power source)
22: Propeller shaft
30a: First universal joint
30b: Second universal joint
46a: Large-diameter cylindrical section
46b: First small-diameter cylindrical section
46c: Second small-diameter cylindrical section

48a: First tapered cylindrical section
48b: Second tapered cylindrical section
m1: First tubular member
m2: Second tubular member
CL: Axis of rotation
Ts: Tensile strength

What is claimed is:

1. A vehicular propeller shaft through which a rotary motion of a drive power source is transmitted to drive wheels, the vehicular propeller shaft comprising:
    a first tubular member having a large-diameter cylindrical section, a small-diameter cylindrical section having a smaller outside diameter than the large-diameter cylindrical section, and a tapered cylindrical section formed between one end of the large-diameter cylindrical section and the small-diameter cylindrical section, and wherein the large-diameter cylindrical section, the small-diameter cylindrical section and the tapered cylindrical section are formed integrally with each other; and
    a second tubular member coaxially joined to the first tubular member and formed of a material having a higher degree of strength than the first tubular member,
    wherein the second tubular member has a smaller wall thickness than the first tubular member.

2. The vehicular propeller shaft according to claim 1, wherein the second tubular member has a larger dimension in its axial direction than the first tubular member.

3. The vehicular propeller shaft according to claim 1, wherein a difference between values of strength of materials of the first and second tubular members is at least 100 MPa.

4. The vehicular propeller shaft according to claim 1, wherein the second tubular member has the same outside diameter as the small-diameter cylindrical section of the first tubular member and is joined to the small-diameter cylindrical section.

5. The vehicular propeller shaft according to claim 1, wherein the first tubular member further has another small-diameter cylindrical section having a smaller outside diameter than the large-diameter cylindrical section and said small-diameter cylindrical section, and another tapered cylindrical section formed between the other end of the large-diameter cylindrical section and said another small-diameter cylindrical section.

6. The vehicular propeller shaft according to claim 5, wherein said another small-diameter cylindrical section is connected to a first universal joint through a shaft an axial length of which is variable, and the second tubular member is connected, at its axial end remote from the first tubular member, to a second universal joint.

7. A vehicular propeller shaft through which a rotary motion of a drive power source is transmitted to drive wheels, the vehicular propeller shaft comprising:
    a first tubular member having a large-diameter cylindrical section, a small-diameter cylindrical section having a smaller outside diameter than the large-diameter cylindrical section, and a tapered cylindrical section formed between one end of the large-diameter cylindrical section and the small-diameter cylindrical section, and wherein the large-diameter cylindrical section, the small-diameter cylindrical section and the tapered cylindrical section are formed integrally with each other; and
    a second tubular member coaxially joined to the first tubular member and formed of a material having a higher degree of strength than the first tubular member,
    wherein the second tubular member has a larger dimension in its axial direction than the first tubular member.

8. The vehicular propeller shaft according to claim 7, wherein a difference between values of strength of materials of the first and second tubular members is at least 100 MPa.

9. The vehicular propeller shaft according to claim 7, wherein the second tubular member has the same outside diameter as the small-diameter cylindrical section of the first tubular member and is joined to the small-diameter cylindrical section.

10. The vehicular propeller shaft according to claim 7, wherein the first tubular member further has another small-diameter cylindrical section having a smaller outside diameter than the large-diameter cylindrical section and said small-diameter cylindrical section, and another tapered cylindrical section formed between the other end of the large-diameter cylindrical section and said another small-diameter cylindrical section.

11. The vehicular propeller shaft according to claim 10, wherein said another small-diameter cylindrical section is connected to a first universal joint through a shaft an axial length of which is variable, and the second tubular member is connected, at its axial end remote from the first tubular member, to a second universal joint.

12. A vehicular propeller shaft through which a rotary motion of a drive power source is transmitted to drive wheels, the vehicular propeller shaft comprising:
    a first tubular member having a large-diameter cylindrical section, a small-diameter cylindrical section having a smaller outside diameter than the large-diameter cylindrical section, and a tapered cylindrical section formed between one end of the large-diameter cylindrical section and the small-diameter cylindrical section, and wherein the large-diameter cylindrical section, the small-diameter cylindrical section and the tapered cylindrical section are formed integrally with each other; and
    a second tubular member coaxially joined to the first tubular member and formed of a material having a higher degree of strength than the first tubular member,
    wherein the second tubular member has the same outside diameter as the small-diameter cylindrical section of the first tubular member and is joined to the small-diameter cylindrical section.

13. The vehicular propeller shaft according to claim 12, wherein a difference between values of strength of materials of the first and second tubular members is at least 100 MPa.

14. The vehicular propeller shaft according to claim 12, wherein the first tubular member further has another small-diameter cylindrical section having a smaller outside diameter than the large-diameter cylindrical section and said small-diameter cylindrical section, and another tapered cylindrical section formed between the other end of the large-diameter cylindrical section and said another small-diameter cylindrical section.

15. The vehicular propeller shaft according to claim 14, wherein said another small-diameter cylindrical section is connected to a first universal joint through a shaft an axial length of which is variable, and the second tubular member is connected, at its axial end remote from the first tubular member, to a second universal joint.

16. A vehicular propeller shaft through which a rotary motion of a drive power source is transmitted to drive wheels, the vehicular propeller shaft comprising:
    a first tubular member having a large-diameter cylindrical section, a small-diameter cylindrical section having a smaller outside diameter than the large-diameter cylindrical section, and a tapered cylindrical section formed between one end of the large-diameter cylindrical section and the small-diameter cylindrical section, and wherein the large-diameter cylindrical section, the small-diameter cylindrical section and the tapered cylindrical section are formed integrally with each other; and a second tubular member coaxially joined to the first tubular member and formed of a material having a higher degree of strength than the first tubular member, wherein the first tubular member further has another small-diameter cylindrical section having a smaller outside diameter than the large-diameter cylindrical section and said small-diameter cylindrical section, and another tapered cylindrical section formed between the other end of the large-diameter cylindrical section and said another small-diameter cylindrical section.

17. The vehicular propeller shaft according to claim 16, wherein a difference between values of strength of materials of the first and second tubular members is at least 100 MPa.

18. The vehicular propeller shaft according to claim 16, wherein said another small-diameter cylindrical section is connected to a first universal joint through a shaft an axial length of which is variable, and the second tubular member is connected, at its axial end remote from the first tubular member, to a second universal joint.

* * * * *